United States Patent
Peng et al.

(10) Patent No.: US 11,561,278 B2
(45) Date of Patent: Jan. 24, 2023

(54) METHOD AND DEVICE FOR PROCESSING INFORMATION BASED ON RADAR WAVES, TERMINAL, AND STORAGE MEDIUM

(71) Applicant: BEIJING XIAOMI MOBILE SOFTWARE CO., LTD., Beijing (CN)

(72) Inventors: Cong Peng, Beijing (CN); Wenjun Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 211 days.

(21) Appl. No.: 16/903,168

(22) Filed: Jun. 16, 2020

(65) Prior Publication Data

US 2021/0223357 A1  Jul. 22, 2021

(30) Foreign Application Priority Data

Jan. 17, 2020  (CN) .......................... 202010054603.5

(51) Int. Cl.
*G01S 7/02* (2006.01)
*H04W 76/11* (2018.01)
*G01S 13/04* (2006.01)

(52) U.S. Cl.
CPC .............. *G01S 7/021* (2013.01); *G01S 13/04* (2013.01); *H04W 76/11* (2018.02)

(58) Field of Classification Search
CPC .......... G01S 7/021; G01S 13/04; G01S 7/003; G01S 13/87; G01S 13/88; H04W 76/11; G06K 17/0022
See application file for complete search history.

(56) References Cited

U.S. PATENT DOCUMENTS

| | | | |
|---|---|---|---|
| 9,516,509 B2* | 12/2016 | Qi | H04W 16/14 |
| 2006/0182045 A1* | 8/2006 | Anderson | H04L 67/04 370/260 |
| 2007/0096885 A1 | 5/2007 | Cheng et al. | |
| 2007/0117576 A1* | 5/2007 | Huston | A63F 13/332 455/461 |
| 2009/0148827 A1 | 6/2009 | Argott | |
| 2012/0254283 A1* | 10/2012 | Peterson | H04W 4/029 709/202 |
| 2014/0075348 A1* | 3/2014 | Sathish | G01C 21/3682 715/764 |
| 2019/0126889 A1* | 5/2019 | Oman | B60R 25/243 |
| 2020/0333456 A1 | 10/2020 | Wang et al. | |

FOREIGN PATENT DOCUMENTS

WO  2017207041 A1  12/2017

OTHER PUBLICATIONS

Supplementary European Search Report in the European application No. 20181486.0, dated Nov. 12, 2020, (xp).

* cited by examiner

*Primary Examiner* — Mazda Sabouri
(74) *Attorney, Agent, or Firm* — Arch & Lake LLP (57) ABSTRACT

The disclosure relates to a method for processing information based on radar waves, applied to a first terminal. The method includes: a first radar signal sent by a second terminal is received during an event; and identification information of a user to which the second terminal belongs is acquired based on the first radar signal.

18 Claims, 10 Drawing Sheets

METHOD AND DEVICE FOR PROCESSING INFORMATION BASED ON RADAR WAVES, TERMINAL, AND STORAGE MEDIUM

CROSS-REFERENCE TO RELATED APPLICATIONS

This application is based upon and claims priority to Chinese Patent Application No. 202010054603.5, filed on Jan. 17, 2020, the entire content of which is incorporated herein by reference.

TECHNICAL FIELD

The disclosure relates to the technical field of radar waves, and more particularly, to a method and device for processing information based on radar waves, a terminal, and a storage medium.

BACKGROUND

At present, physical signatures are commonly adopted for recoding attendance of classes or meetings. However, it is inconvenient to record by using a traditional manual mode or by scanning two-dimensional codes.

In related technologies of radar waves, the radar waves are generally configured to test a distance, recognize and detect an object. At present, the use of radar waves is still in the initial stage in the field of terminals such as mobile phones, computers, and the like. How to utilize radar waves to complete more tasks to facilitate the life, study or work of people has become an urgent technical problem to be solved.

SUMMARY

According to a first aspect of the disclosure, a method for processing information based on radar waves is provided. The method may be applied to a first terminal and include that: a first radar signal sent by a second terminal is received during an event; and identification information of a user to which the second terminal belongs is acquired based on the first radar signal.

According to a second aspect of the disclosure, a method for processing information based on radar waves is provided. The method may be applied to a second terminal and include: identification information of a user to which the second terminal belongs is acquired; and a first radar signal including the identification information is sent during an event. The first radar signal may be used for a first terminal to acquire the identification information.

According to a third aspect of the disclosure, a device for processing information based on radar waves is provided. The device may be applied to a second terminal and include: a processor and a memory for storing instructions executable by the processor. The processor is configured to acquire identification information of a user to which the second terminal belongs, and send a first radar signal including the identification information during an event. The first radar signal is used for a first terminal to acquire the identification information.

According to a fourth aspect of the disclosure, there is provided a terminal, which includes the device for processing information based on radar waves in the third aspect.

According to a fifth aspect of the disclosure, a non-transitory computer-readable storage medium storing a computer program is provided. The program is executed by a processor to implement the method for processing information based on radar waves in the first or second aspect.

It should be understood that the above general description and the following detailed description are exemplary and explanatory only, and are not intended to limit the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Exemplary embodiments will be described in detail herein, examples of which are illustrated in the accompanying drawings. When the following description refers to the accompanying drawings, the same numbers in different drawings represent the same or similar elements unless otherwise indicated. The implementation models described in the following exemplary embodiments do not represent all implementation models consistent with the disclosure. On the contrary, they are merely examples of devices and methods consistent with some aspects of the disclosure as detailed in the appended claims.

Figure 1:
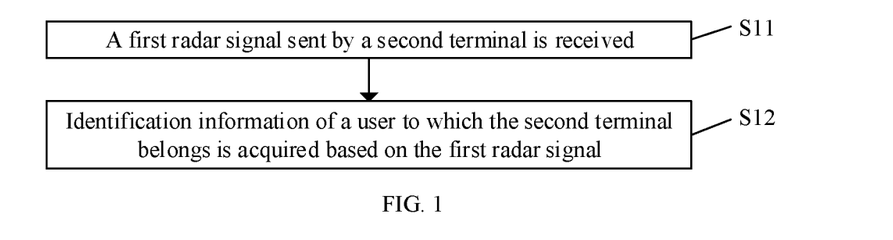
FIG. 1 is a flow chart showing a method for processing information based on radar waves according to an example.

FIG. 1 is a flow chart showing a method for processing information based on radar waves according to an example. As illustrated in FIG. 1, the method is applied to a first terminal and includes the following steps.

In S11, a first radar signal sent by a second terminal is received during an event. The event may be a conference, a lecture, a class, a work and an athletic meeting, and the like.

In S12, identification information of a user to which the second terminal belongs is acquired based on the first radar signal.

In the embodiments of the disclosure, the first terminal is a terminal provided with a radar sensor. Here, the first terminal may be a mobile terminal or a fixed terminal. For example, the first terminal may be a mobile phone, a computer, a tablet computer, a wearable device, and the like. In short, any terminal provided with a radar sensor may be the first terminal in the embodiments of the disclosure.

In the embodiments of the disclosure, the second terminal is a mobile terminal provided with a radar sensor. For example, the second terminal may be a mobile phone, a tablet computer, a wearable device, and the like. In short, any mobile terminal provided with a radar sensor may be the second terminal in the embodiments of the disclosure.

Here, the first terminal or the second terminal may include at least one radar sensor. The first terminal may be referred as the host terminal. The second terminal may also be referred as the attendee terminal.

Figure 2:
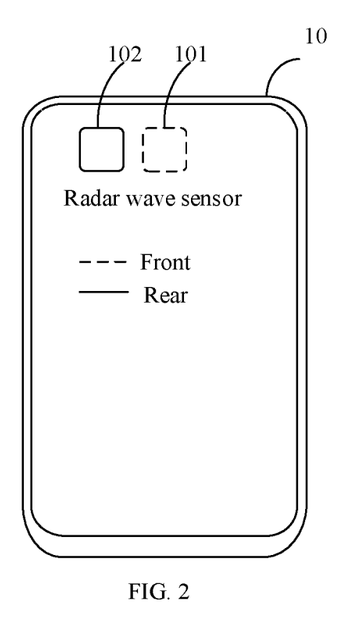
FIG. 2 is a schematic diagram illustrating a second terminal with a radar sensor according to an example.

For example, as illustrated in FIG. 2, the second terminal is a mobile phone. At least two radar sensors are mounted on the mobile phone 100. For example, the two radar sensors may include a front radar sensor 101 mounted on a display screen of the mobile phone 100 and a rear radar sensor 102 mounted on a side of the mobile phone 100 opposite to the display screen.

In the embodiments of the disclosure, the first radar signal includes the identification information. Here, the identification information is configured to uniquely identify the user to which the second terminal belongs.

Here, the identification information may include but is not limited to at least one of: a mobile phone number, an ID card number, a Wechat number, an email address, a QQ number, or any other identity associated with the second terminal.

In an embodiment, the identification information may be an encoded character string. For example, the identification information may be a section of digital character string after binary encoding, such as 010, 10110, or the like.

In an embodiment, step S11 includes: at least one first radar signal sent by the second terminal is received during an event. Therefore, in the embodiment, the second terminal may acquire one or more pieces of identification information of the user to which the second terminal belongs.

In an embodiment, a mode for implementing step S12 includes: the first terminal decodes the first radar signal to obtain the identification information.

In the embodiments of the disclosure, on the one hand, the first radar signal sent by the second terminal may be received through the first terminal, the identification information may be acquired from the received first radar signal, and information interaction between the first terminal and the second terminal may be realized without establishing a connection such as a wireless network connection, a wired network connection, or the like in the related art. On the other hand, it is convenient for the first terminal to perform further operations based on the acquired identification information, thereby improving user experience.

Figure 3:
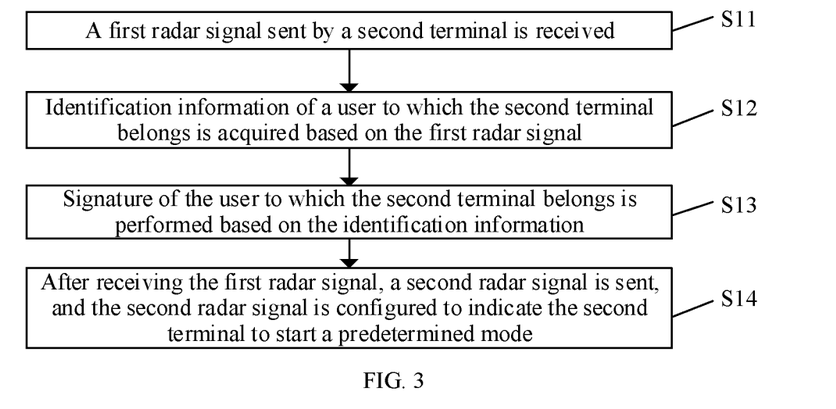
FIG. 3 is a flow chart showing a method for processing information based on radar waves according to an example.

As illustrated in FIG. 3, in some embodiments, the method may further include as follows.

In S13, signature of the user to which the second terminal belongs is performed based on the identification information. For example, the host terminal may record attendance signature of the user to the event based on the identification information.

In the embodiments of the disclosure, the first terminal may perform signature of the user to which the terminal belongs based on the identification information after acquiring the identification information of the user to which the second terminal belongs.

Here, the signature of the user to which the terminal belongs may include signature in various scenarios or events, such as a conference, a lecture, a class, a work and an athletic meeting, and the like, which is not limited herein.

For example, in a conference scenario, a first terminal is disposed in a conference room or at an entrance of the conference room; when a user taking along a second terminal enters the conference room, the first terminal receives the identification information sent by the second terminal; and the first terminal records the identification information, thereby completing the signature of the user. Therefore, there is no need to manually record the users participating in the conference, and it is convenient to realize the signature work of the users participating in the conference.

For another example, in a class scenario, a first terminal is disposed in a classroom or at an entrance of the classroom; when a student taking along a second terminal enters the classroom, the first terminal receives the identification information sent by the second terminal; and the first terminal records the identification information, thereby completing the signature of the student. Therefore, there is no need for a teacher to record all students who attend the class, it is convenient to realize the signature work of students who attend the class, and the teacher and the students can attend the class as soon as possible to improve the teaching quality.

In the embodiment of the disclosure, the identification information included in the radar signal can be acquired, and based on the identification information, attendance signature in various scenarios, such as a class, a conference, a lecture, a works, and the like, can be recorded conveniently without physical contact. In this way, in the embodiments of the disclosure, the signature of a user can be recorded based on the received radar signal, such that the signature work can be easily completed, and the user experience and the intelligence of the terminal can be greatly improved.

Referring to FIG. 3 again, as illustrated in FIG. 3, in some embodiments, the method may further include as follows.

In S14, after receiving the first radar signal, a second radar signal is sent; and the second radar signal is configured to indicate the second terminal to start a predetermined mode for the event. The predetermined mode for the event may include one of following modes: a silent mode or a conference mode. In the silent mode, the second terminal may mute all notifications. In the conference mode, the second terminal may start voice recording or start other preset conference functions in addition to muting all notifications.

In an embodiment, the second radar signal is a radar signal including first indication information. In another embodiment, the second radar signal is a radar signal including second indication information.

Specifically, in case of the second radar signal including the first indication information, the second radar signal is configured to indicate the second terminal to start the predetermined mode; and in case of the second radar signal including the second indication information, the second radar signal is configured to indicate the second terminal to terminate the predetermined mode.

Here, the first indication information or the second indication information may also be a section of mathematical character string. For example, the first indication information is 0000, and the second indication information is 0001.

Here, the predetermined mode is a mode in which sound is turned off. For example, the predetermined mode includes but is not limited to any one of: a silent mode, a conference mode or a do not disturb (DND) mode.

In some embodiments, the predetermined mode may also be a flight mode.

In some embodiments, the step of sending the second radar signal includes:

when the identification information is acquired for a first time within a predetermined time range, a second radar signal including first indication information is sent; and the first indication information is configured to indicate the second terminal to start the silent mode or the conference mode.

Here, the predetermined time range is different based on different signature scenarios or events.

For example, when the signature is in a work scenario, the predetermined time range may be a first value, and the first value may be 8 hours, 9 hours, 10 hours, or the like. For another example, when the signature is in a class scenario, the predetermined time range is a second value, and the second value may be 40 minutes, 45 minutes, 1 hour, 2 hours, or the like. For another example, when the signature is in a conference or lecture scenario, the predetermined time range is a third value, and the third value may be 1 hour, 2 hours, 3 hours, 4 hours or the like.

In the embodiments of the disclosure, when the identification information is acquired for the first time within a predetermined time range, it may be determined that the second terminal enters the signature conference room where the first terminal is located for the first time, and then, it may be determined to send the second radar signal including the first indication information, such that the second terminal starts the silent mode or the conference mode. Therefore, it is possible to prevent the second terminal from disturbing others by ringing or vibrating during a meeting or a class.

Furthermore, the unified setting of multiple second terminals may be completed, and then, all the second terminals are kept in the silent mode or the conference mode, thereby maintaining the quietness of the signature conference room, and avoiding interruption or influence of the normal progress of a class, a meeting, a lecture, a work, and the like in the conference room.

In other embodiments, the step of sending the second radar signal includes: when the identification information is not acquired for a first time within a predetermined time range, a second radar signal including second indication information is sent; and the second indication information is configured to indicate the second terminal to terminate the predetermined mode.

In the embodiments of the disclosure, when the identification information is not acquired for the first time within a predetermined time range, it may be considered that the second terminal leaves the signature conference room, such as a conference, a class, and the like; therefore, the second terminal may terminate the predetermined mode, and the mode before the second terminal enters the signature conference room is restored. In this way, when a user leaves the signature conference room, there is no need to manually set the second terminal to terminate the silent mode or the conference mode, thereby further facilitating the user and improving the intelligence of the terminal.

Of course, in other embodiments: the step of sending the second radar signal may further include: when the identification information is acquired for an odd number of times within a predetermined time range, a second radar signal including first indication information is sent; and the first indication information is configured to indicate the second terminal to start a predetermined mode;

or, when the identification information is acquired for an even number of times within a predetermined time range, a second radar signal including second indication information is sent; and the second indication information is configured to indicate the second terminal to terminate the predetermined mode.

Therefore, in the embodiments, it may be determined whether to send the second radar signal including the first indication information or the second radar signal including the second indication information according to the acquired number of times of the identification information. Specifically, when the identification information is acquired for an odd number of times, it is determined that the user enters the signature conference room and that the second terminal needs to start the silent mode or the conference mode, and then the second radar signal including the first indication information may be sent; and when the identification information is acquired for an even number of times, it is determined that the user leaves the signature conference room and that the second terminal needs to terminate the silent mode or the conference mode, and then the second radar signal including the second indication information may be sent.

In other embodiments, the first terminal includes a first radar sensor and a second radar sensor.

The step of sending the second radar signal after receiving the first radar signal includes:

when the first radar signal is received based on the first radar sensor, a second radar signal including first indication information is sent;

or, when the first radar signal is received based on the second radar sensor, a second radar signal including second indication information is sent.

Here, the positions of the first radar sensor and the second radar sensor in the first terminal are different. For example, in an embodiment, the first radar sensor is positioned at a side of the first terminal close to a signature conference room, and the second radar sensor is positioned at a side of the first terminal far from the signature conference room.

In the embodiments of the disclosure, it can be determined whether the user to which the second terminal belongs enters or leaves a signature scenario according to the first radar signal received by different radar sensors in the first terminal, in view of this, the second radar waves including different indication information is sent to the second terminal, such that the second terminal starts a mode corresponding to different indication information.

It should be noted that the following description of a method for processing information based on radar waves is applied to a second terminal, and is similar to the above description of the method for processing information based on radar waves applied to a first terminal. The undisclosed technical details in the embodiments of the method for processing information based on radar waves applied to a second terminal in the disclosure refer to the description of the embodiments of the method for processing information based on radar waves applied to a first terminal in the disclosure, and are not elaborated here.

Figure 4:
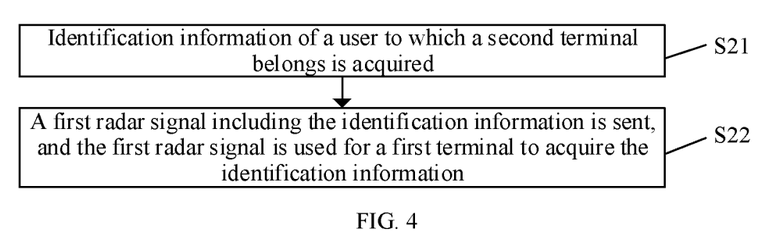
FIG. 4 is a flow chart showing a method for processing information based on radar waves according to an example.

FIG. 4 is a flow chart showing a method for processing information based on radar waves according to an example. As illustrated in FIG. 4, the method is applied to a second terminal and includes the following steps.

In S21, identification information of a user to which the second terminal belongs is acquired.

In S22, a first radar signal including the identification information is sent, and the first radar signal is used for a first terminal to acquire the identification information.

The identification information is used for signature of the user corresponding to the identification information in the first terminal.

Here, an implementation mode of step S21 is as follows: user information may be input into the second terminal, and based on the user information, the identification information of the user may be generated.

Here, the user information may include but is not limited to at least one of: a name, an identity (ID) card number or a position. Here, an implementation mode of step S22 is as follows: the identification information is encoded in the first radar signal, and the first radar signal is sent.

In an embodiment, step S22 includes: the first radar signal including the identification information is sent to the first terminal, and the first terminal is within a first predetermined distance of the second terminal. For example, the second terminal may be aligned with the first terminal, and then, the second terminal will send the first radar signal to the first terminal, such that the first terminal completes a collection of the identification information.

In the embodiments of the disclosure, the second terminal sends the identification information of the user, to which the second terminal belongs, to the first terminal through the first radar signal without establishing a wireless network connection, a wired network connection, or the like, therefore, radar waves may be applied to more scenarios, the user experience is improved, and it is convenient for subsequent processing performed by the first terminal based on the identification information.

Furthermore, when the identification information is used for signature of the user, such as signature for a conference, a lecture, a class, a work, or the like, the signature may be easily completed without manual signature, thereby improving the user experience and the intelligence of the terminal.

Figure 5:
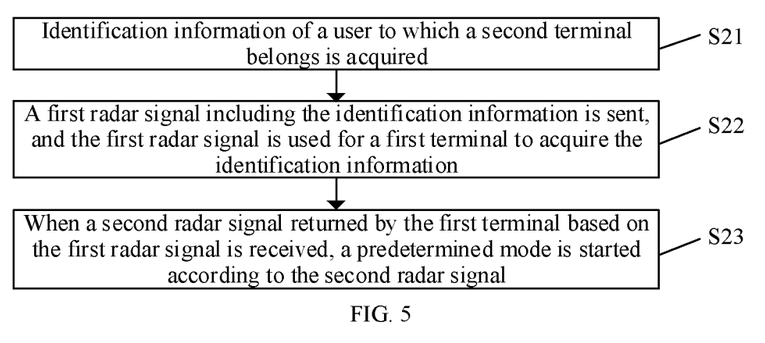
FIG. 5 is a flow chart showing a method for processing information based on radar waves according to an example.

As illustrated in FIG. 5, in some embodiments, the method may further include the following step.

In S23, when a second radar signal returned by the first terminal based on the first radar signal is received, a predetermined mode is started according to the second radar signal.

In some embodiments, the predetermined mode includes a silent mode or a conference mode.

The step of starting the predetermined mode according to the second radar signal includes: in case of a second radar signal including first indication information, the silent mode or the conference mode is started.

In other embodiments, the method may further include: in case of a second radar signal including second indication information, the predetermined mode is terminated.

In some embodiments, before sending the first radar signal including the identification information, the method may further include:

based on a wireless signal positioning mode, whether the second terminal enters a predetermined range of a target position is determined; and when the second terminal enters the predetermined range of the target position, a radar sensor is started, and the second terminal sends the first radar signal after the radar sensor is started.

Here, the target position is a signature conference room in the above embodiments. For example, the target position may be a conference room, a classroom, an office, a gymnasium, and the like.

It can be understood that the first terminal is a terminal in the target position, and the second terminal is a terminal that moves as the user to which the second terminal belongs moves.

In the embodiments of the disclosure, whether the second terminal enters a predetermined range of the target position may be determined according to strength of a wireless signal between the first terminal and the second terminal. Of course, in other embodiments, the distance between the second terminal and the target position may be determined through an image collected by the second terminal, so as to determine whether the second terminal enters the predetermined range of the target position.

In the embodiments of the disclosure, only when the second terminal enters the predetermined range of the target position, the radar sensor is started, such that the second terminal sends the first radar signal based on the radar sensor. Therefore, the number and time of use of the radar sensor in the second terminal may be greatly reduced, the risk of the radar sensor due to continuous use is reduced, and the electric quantity of the second terminal may be greatly saved.

Figure 6:
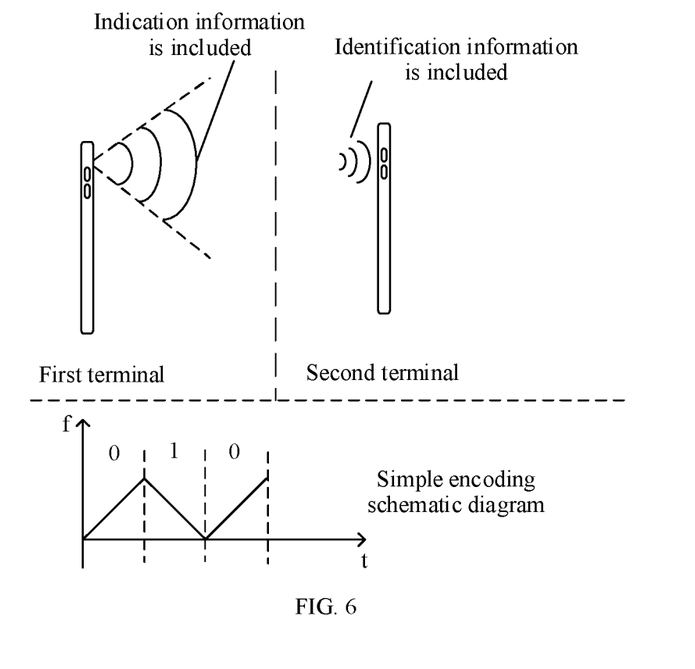
FIG. 6 is a schematic diagram illustrating a system for processing information based on radar waves according to an example.

In order to help understand the above embodiments of the disclosure, the following examples are taken for description. FIG. 6 discloses a schematic diagram illustrating a system for processing information based on radar waves. As illustrated in FIG. 6, the first terminal and the second terminal may transmit information through radar signals. For example, the second terminal sends a first radar signal including identification information to the first terminal. For another example, the first terminal sends a second radar signal including indication information to the second terminal. Both the identification information and the indication information may be a section of numerical character string after encoding, such as a character string of 010 in FIG. 6.

Figure 7:
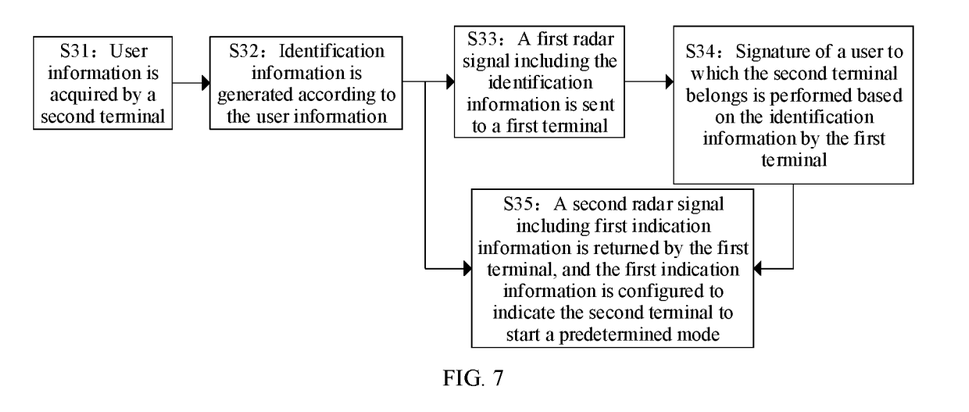
FIG. 7 is a flow chart showing a method for processing information based on radar waves according to an example.

FIG. 7 is a flow chart showing a method for processing information based on radar waves according to an example. The method for processing information based on radar waves is applied to a system for processing information based on radar waves according to the above embodiment. The system includes a first terminal and a second terminal. As illustrated in FIG. 7, the method includes the following steps.

In S31, the second terminal acquires user information.

Optionally, based on manual input of a user, the second terminal acquires the user information.

In S32, identification information is generated according to the user information.

Optionally, the second terminal generates the corresponding identification information based on the user information.

In S33, a first radar signal including the identification information is sent to the first terminal.

Optionally, the second terminal sends the first radar signal including the identification information to the first terminal.

In S34, the first terminal performs signature of a user to which the second terminal belongs based on the identification information.

Optionally, the first terminal receives the first radar signal and acquires the identification information from the first radar signal, and performs signature of the user to which the second terminal belongs based on the identification information.

In S35: the first terminal returns a second radar signal including first indication information, and the first indication information is configured to indicate the second terminal to start a predetermined mode.

Optionally, after receiving the first radar signal, the first terminal returns the second radar signal including the first indication information, and the first indication information is configured to indicate the second terminal to start the predetermined mode which includes a silent mode or a conference mode.

It can be understood that, in some application scenarios, the first terminal performs signature of the user to which the second terminal belongs based on the identification information, thereby completing the signature work, such as steps S31 to S34 in the above embodiment.

In other application scenarios, the first terminal performs signature of the user to which the second terminal belongs based on the identification information, and sends the second radar signal to the second terminal, and the second terminal starts the silent mode or the conference mode based on the second radar signal, thereby completing the signature work, such as steps S31 to S35 in the above embodiment.

In the embodiments of the disclosure, the first terminal and the second terminal may transmit information through the radar signal, such that radar waves may be applied to more scenarios, and the user experience is improved. Furthermore, it is convenient for subsequent processing performed by the first terminal based on the identification information.

Furthermore, in the embodiments of the disclosure, after the first terminal receives the first radar signal, the second radar signal including the first indication information may be returned to the second terminal, such that the second terminal may start the silent mode or the conference mode according to the first indication information after receiving the second radar signal. Therefore, it realizes the automatic setting of the second terminal starting the silent mode or the conference mode without manual setting, and it can further facilitate the user and improve the intelligence of the terminal.

Further, when there are multiple second terminals, the unified setting of multiple second terminals may be completed, and then, all the second terminals are kept in the silent mode or the conference mode, thereby maintaining the quietness of a signature conference room, and avoiding interruption or influence of the normal progress of a class, a meeting, a lecture, a work, and the like. in the conference room.

Figure 8:
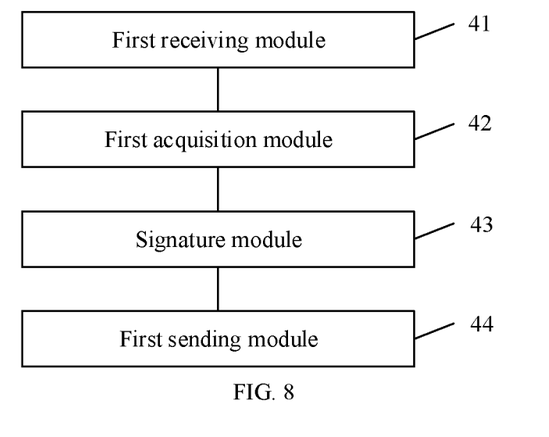
FIG. 8 is a block diagram of a device for processing information based on radar waves according to an example.

FIG. 8 is a block diagram of a device for processing information based on radar waves according to an example. Referring to FIG. 8, the device includes a first receiving module 41 and a first acquisition module 42.

The first receiving module 41 is configured to receive a first radar signal sent by a second terminal.

The first acquisition module 42 is configured to acquire identification information of a user to which the second terminal belongs based on the first radar signal.

In some embodiments, the device may further include: a signature module 43, which is configured to perform signature of the user to which the second terminal belongs based on the identification information.

In some embodiments, the device may further include: a first sending module 44, which is configured to send a second radar signal after receiving the first radar signal. The second radar signal is configured to indicate the second terminal to start a predetermined mode.

In some embodiments, the predetermined mode includes a silent mode or a conference mode.

The first sending module 44 is configured to send a second radar signal including first indication information when the identification information is acquired for a first time within a predetermined time range. The first indication information is configured to indicate the second terminal to start the silent mode or the conference mode.

In some embodiments, the first sending module 44 is configured to send a second radar signal including second indication information when the identification information is not acquired for a first time within a predetermined time range. The second indication information is configured to indicate the second terminal to terminate the predetermined mode.

Figure 9:
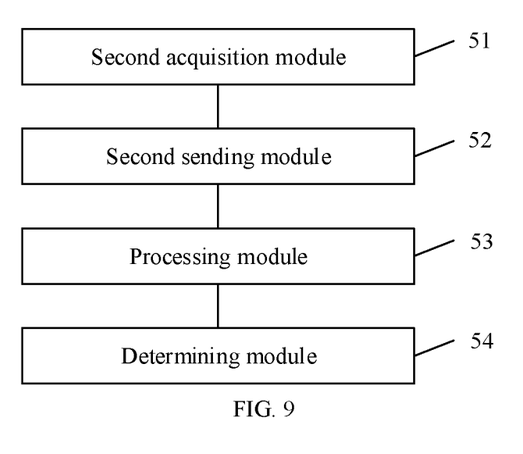
FIG. 9 is a block diagram of a device for processing information based on radar waves according to an example.

FIG. 9 is a block diagram of a device for processing information based on radar waves according to an example. Referring to FIG. 9, the device includes a second acquisition module 51 and a second sending module 52.

The second acquisition module 51 is configured to acquire identification information of a user to which a second terminal belongs.

The second sending module 52 is configured to send a first radar signal including the identification information. The first radar signal is used for a first terminal to acquire the identification information.

In some embodiments, the identification information is used for signature of the user corresponding to the identification information in the first terminal.

In some embodiments, the device may further include: a processing module 53 configured, when a second radar signal returned by the first terminal based on the first radar signal is received, to start a predetermined mode according to the second radar signal.

In some embodiments, the predetermined mode includes a silent mode or a conference mode.

The processing module 53 is configured to start the silent mode or the conference mode in case of a second radar signal including first indication information.

In some embodiments, the processing module 53 is further configured to terminate the predetermined mode in case of a second radar signal including second indication information.

In some embodiments, the device may further include: a determining module 54, which is configured to determine whether the second terminal enters a predetermined range of a target position based on a wireless signal positioning mode.

The processing module 53 is further configured to start a radar sensor when the second terminal enters the predetermined range of the target position. The second terminal sends the first radar signal after the radar sensor is started.

With respect to the device in the above embodiment, the specific manners for performing operations for individual modules therein have been described in detail in the method embodiments, which will not be elaborated herein.

The embodiments of the disclosure further provide a first terminal, which includes:
a first processor; and
a first memory for storing instructions executable by the first processor.

The first processor is configured to implement the method for processing information based on radar waves according to any embodiment applied to the first terminal in the disclosure when the executable instructions are executed.

The first memory may include various types of storage media which are non-transitory computer storage media that can continue to memorize the information stored on a communication device after power off.

The first processor may be coupled to the memory through a bus and the like to read executable programs stored on the memory, for example, to implement at least one of the method as illustrated in FIG. 1 or FIG. 3.

The embodiments of the disclosure further provide a second terminal, which includes:
a second processor; and
a second memory for storing instructions executable by the second processor.

The second processor is configured to implement the method for processing information based on radar waves according to any embodiment applied to the second terminal in the disclosure when the executable instructions are executed.

The second memory may include various types of storage media which are non-transitory computer storage media that can continue to memorize the information stored on a communication device after power off.

The second processor may be coupled to the memory through a bus and the like to read executable programs stored on the memory, for example, to implement at least one of the method as illustrated in FIG. 4 or FIG. 5.

With respect to the device in the above embodiment, the specific manners for performing operations for individual modules therein have been described in detail in the method embodiments, which will not be elaborated herein.

The embodiments of the disclosure further provide a computer-readable storage medium storing a computer program. The program is executed by a processor to implement the method for processing information based on radar waves according to any embodiment in the disclosure.

Figure 10:
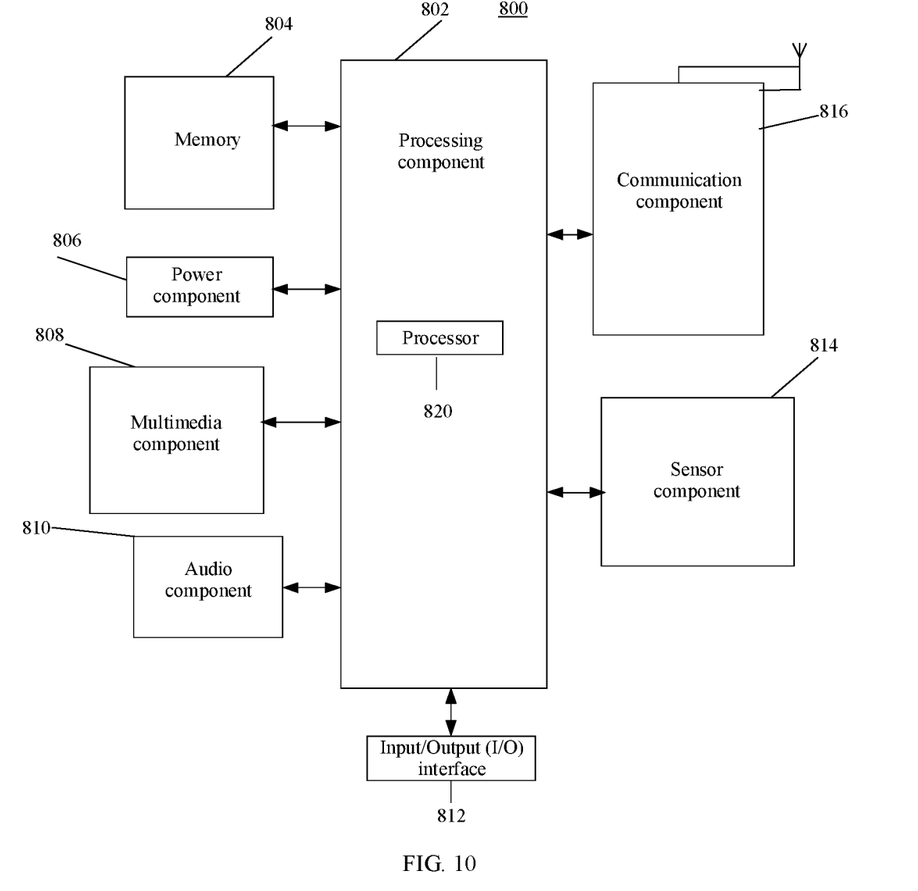
FIG. 10 is a block diagram of a terminal according to an example.

FIG. 10 is a block diagram of a terminal 800 according to an example. For example, the terminal 800 may be a mobile phone, a computer, a digital broadcast terminal, a messaging device, a gaming console, a tablet, a medical device, exercise equipment, a personal digital assistant, and the like.

Referring to FIG. 10, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as operations associated with display, telephone calls, data communications, camera operations, and recording operations. The processing component 802 may include one or a plurality of processors 820 to execute instructions to complete all or part of the steps of the method described above. In addition, the processing component 802 may include one or a plurality of modules to facilitate interaction between the processing component 802 and other components. For example, the processing component 802 may include a multimedia module to facilitate interaction between the multimedia component 808 and the processing component 802.

The memory 804 is configured to store various types of data to support operations of the device 800. Examples of such data include instructions for any applications or methods operated on the terminal 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with generation, management and distribution of power for the terminal 800.

The multimedia component 808 includes a screen providing an output interface between the terminal 800 and a user. In some embodiments, the screen may include a liquid crystal display (LCD) and a touch panel (TP). If the screen includes the TP, the screen may be implemented as a touch screen to receive an input signal from a user. The TP includes one or more touch sensors to sense touches, swipes, and gestures on the TP. The touch sensors may not only sense a boundary of a touch or swipe action, but also detect a period of time and a pressure associated with the touch or swipe operation. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or may have focal lengths and optical zoom capabilities.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signals may further be stored in the memory 804 or sent via the communication component 816. In some embodiments, the audio component 810 further includes a speaker configured to output the audio signals.

The I/O interface 812 provides an interface between the processing component 802 and peripheral interface modules, such as a keyboard, a click wheel, buttons, and the like. These buttons may include, but are not limited to: a home button, a volume button, a starting button, and a locking button.

The sensor component 814 includes one or more sensors configured to provide status assessments of various aspects of the terminal 800. For example, the sensor component 814 may detect an on/off status of the device 800 and relative positioning of components, such as a display and small keyboard of the terminal 800, and the sensor component 814 may further detect a change in a position of the terminal 800 or a component of the terminal 800, the presence or absence of contact between a user and the terminal 800, the orientation or acceleration/deceleration of the terminal 800, and a change in temperature change of the terminal 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communication between the terminal 800 and other devices. The terminal 800 may access a communication-standard-based wireless network, such as a wireless fidelity (WiFi) network, a 2nd-generation (2G) or 3rd-generation (3G) network, or a combination thereof. In an example, the communication component 816 receives broadcast signals or broadcast associated information from an external broadcast management system via a broadcast channel. In an example, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In examples, the terminal 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, and is configured to execute the above described methods.

In examples, there is also provided a non-transitory computer-readable storage medium including instructions, such as included in the memory 804, executable by the processor 820 of the terminal 800, for performing the above described methods. For example, the non-transitory computer-readable storage medium may be an ROM, a random access memory (RAM), a compact disc read-only memory (CD-ROM), a magnetic tape, a floppy disk, an optical data storage device, and the like.

Other embodiments of the present disclosure will be apparent to those skilled in the art from consideration of the specification and practice of the disclosure herein. The disclosure is intended to cover any variations, uses, or adaptations of the disclosure following the general principles thereof and including such departures from the disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for processing information based on radar waves, comprising:
   receiving, by a first terminal comprising a first radar sensor, a first radar signal sent by a second terminal during an event, wherein before the second terminal sends the first radar signal, the second terminal determines whether the second terminal enters a predetermined range of a target position based on a wireless signal positioning mode, wherein the second terminal starts a second radar sensor in response to determining that the second terminal enters the predetermined range of the target position, and wherein the second terminal sends the first radar signal after the second radar sensor is started; and
   acquiring, by the first terminal, identification information of a user to which the second terminal belongs based on the first radar signal.

2. The method of claim 1, further comprising:
   recording, by the first terminal, attendance signature of the user to the event based on the identification information.

3. The method of claim 1, further comprising:
   after receiving the first radar signal, sending a second radar signal configured to indicate the second terminal to start a predetermined mode for the event.

4. The method of claim 3, wherein the predetermined mode for the event comprises a silent mode or a conference mode;
   wherein sending the second radar signal comprises:
   when the identification information is acquired for a first time within a predetermined time range, sending a second radar signal including first indication information; wherein the first indication information is configured to indicate the second terminal to start the silent mode or the conference mode.

5. The method of claim 3, wherein sending the second radar signal comprises:
   when the identification information is not acquired for a first time within a predetermined time range, sending a second radar signal including second indication information; wherein the second indication information is configured to indicate the second terminal to terminate the predetermined mode for the event.

6. A method for processing information based on radar waves, applied to an attendee terminal, comprising:
   acquiring identification information of a user to whom the attendee terminal belongs; and
   sending a first radar signal including the identification information during an event, wherein the first radar signal is used by a host terminal to acquire the identification information,
   wherein before sending the first radar signal including the identification information, the method further comprises:
   based on a wireless signal positioning mode, determining whether the attendee terminal enters a predetermined range of a target position; and
   in response to determining that that the attendee terminal enters the predetermined range of the target position, starting a radar sensor, wherein the attendee terminal sends the first radar signal after the radar sensor is started.

7. The method of claim 6, wherein the identification information is used for recording attendance signature of the user to the event in the host terminal.

8. The method of claim 6, further comprising:
   when a second radar signal returned by the host terminal based on the first radar signal is received, starting a predetermined mode for the event according to the second radar signal.

9. The method of claim 8, wherein the predetermined mode for the event comprises a silent mode or a conference mode;
   wherein the starting the predetermined mode for the event according to the second radar signal comprises:
   in case of a second radar signal including first indication information, starting the silent mode or the conference mode.

10. The method of claim 8, further comprising:
    in case of a second radar signal including second indication information, terminating the predetermined mode for the event.

11. A device for processing information based on radar waves, applied to an attendee terminal, comprising:
    a processor; and
    a memory for storing instructions executable by the processor;
    wherein the processor is configured to:
    acquire identification information of a user to which the attendee terminal belongs; and
    send a first radar signal including the identification information during an event, wherein the first radar signal is used for a host terminal to acquire the identification information,
    wherein before sending the first radar signal including the identification information, the processor is further configured to:
    determine whether the attendee terminal enters a predetermined range of a target position based on a wireless signal positioning mode; and
    start a radar sensor in response to determining that that the attendee terminal enters the predetermined range of the target position, wherein the attendee terminal sends the first radar signal after the radar sensor is started.

12. The device of claim 11, wherein the identification information is used for recording attendance signature of the user to the event in the host terminal.

13. The device of claim 11, wherein the processor is further configured to:
when a second radar signal returned by the host terminal based on the first radar signal is received, start a predetermined mode for the event according to the second radar signal.

14. The device of claim 13, wherein the predetermined mode for the event comprises a silent mode or a conference mode;
wherein the processor is further configured to start the silent mode or the conference mode in case of a second radar signal including first indication information.

15. The device of claim 13, wherein the processor is further configured to terminate the predetermined mode for the event in case of a second radar signal including second indication information.

16. A non-transitory computer-readable storage medium storing a computer program, the program being executed by a processor to implement the method for processing information based on radar waves of claim 1.

17. A non-transitory computer-readable storage medium storing a computer program, the program being executed by a processor to implement the method for processing information based on radar waves of claim 6.

18. The method of claim 1, wherein the identification information is configured to uniquely identify the user to which the second terminal belongs;
wherein the identification information may include at least one of: a mobile phone number, an ID card number, a Wechat number, an email address, or a QQ number;
wherein the identification information is an encoded character string;
wherein the event is a conference, a lecture, a class, a work or an athletic meeting.

* * * * *